United States Patent [19]

Leparulo et al.

[11] 3,847,671

[45] Nov. 12, 1974

[54] HYDRAULICALLY-REFUELABLE METAL-GAS DEPOLARIZED BATTERY SYSTEM

[75] Inventors: Angelo F. Leparulo, North Caldwell; Charles Grun, Matawan, both of N.J.

[73] Assignee: Electromedia Inc., Summit, N.J.

[22] Filed: Apr. 13, 1973

[21] Appl. No.: 351,063

[52] U.S. Cl. .............................................. 136/86 A
[51] Int. Cl. ..................... H01m 27/00, H01m 31/00
[58] Field of Search .............. 136/86 A, 86 E, 86 R

[56] References Cited
UNITED STATES PATENTS 3,758,342   9/1973   Baba ................................. 136/86 A Primary Examiner—Winston A. Douglas
Assistant Examiner—H. A. Feeley
Attorney, Agent, or Firm—Blum Moscovitz Friedman & Kaplan

[57] ABSTRACT

A metal-gas depolarized battery system is so constructed that both solid and liquid contents can be drained from the battery after discharge. The negative grid and the gas depolarized electrode in each cell define a compartment which can be refilled with a slurry of electrolyte and active metal powder, thereby recharging the battery in the time it takes to drain same and refill with said slurry. A system for collecting the discharge products of such a battery and reducing metal ion to metal which can then be slurried with electrolyte and returned to the cells of the battery is also described. The preferred system utilizes zinc, KOH and air and is especially suitable for propulsion of vehicles and the like.

20 Claims, 7 Drawing Figures

FIG. 1
FIG. 2
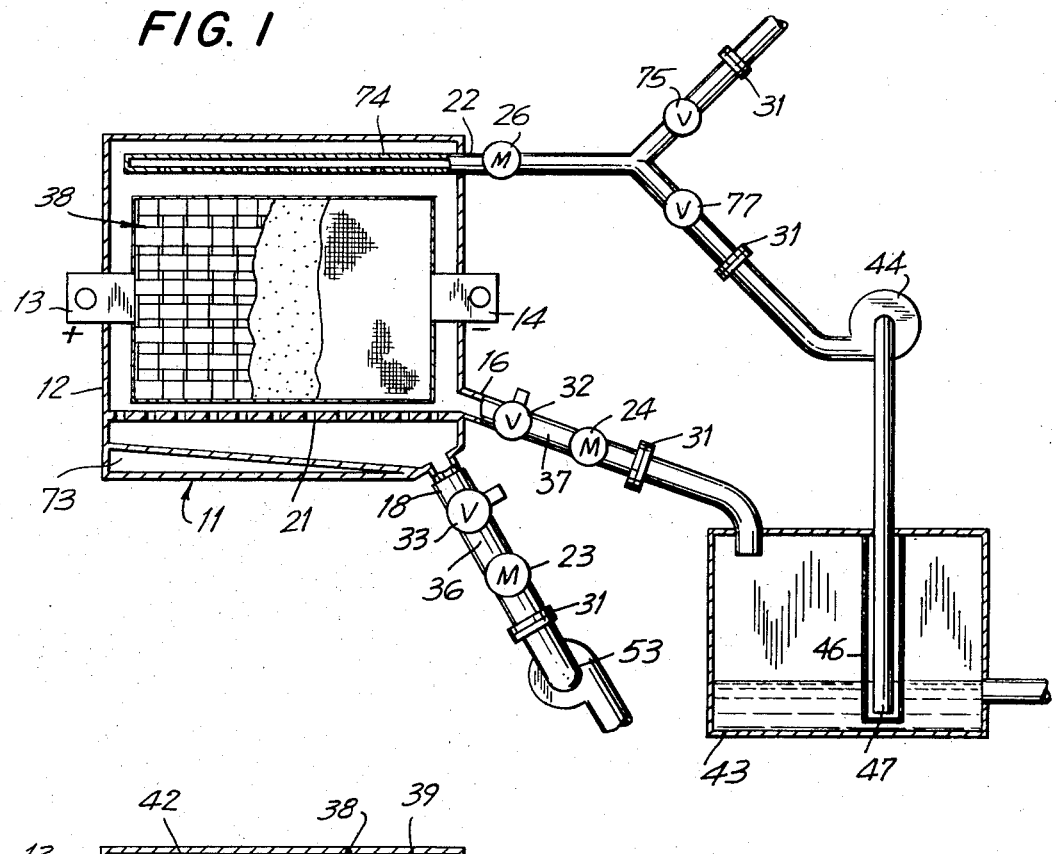
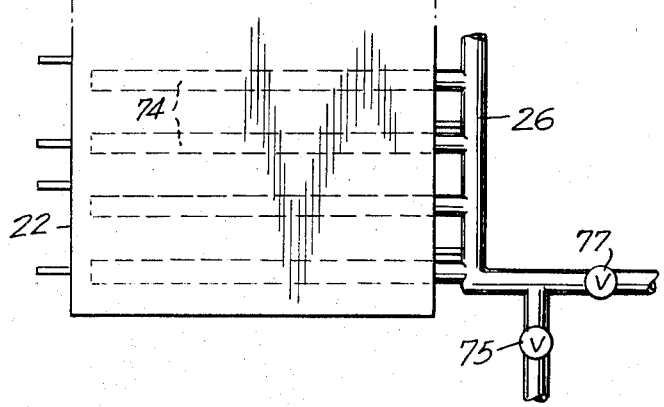

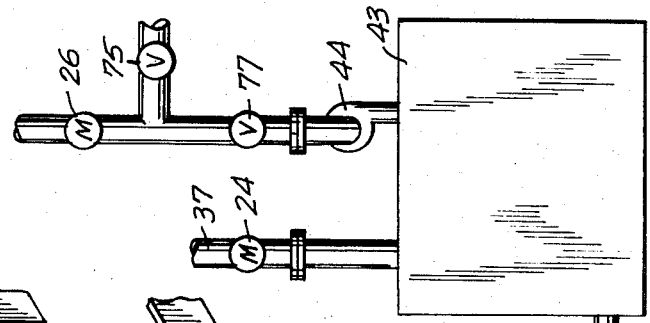
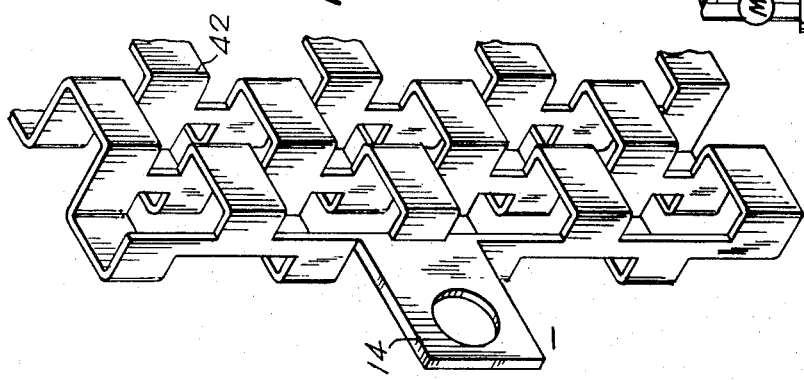
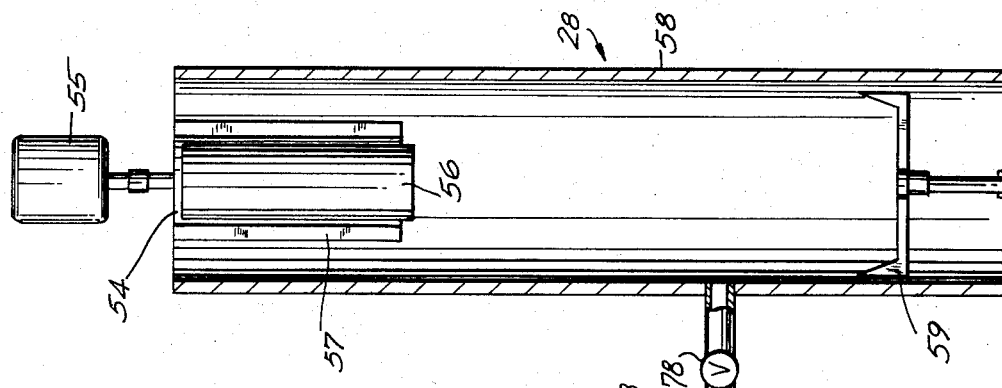
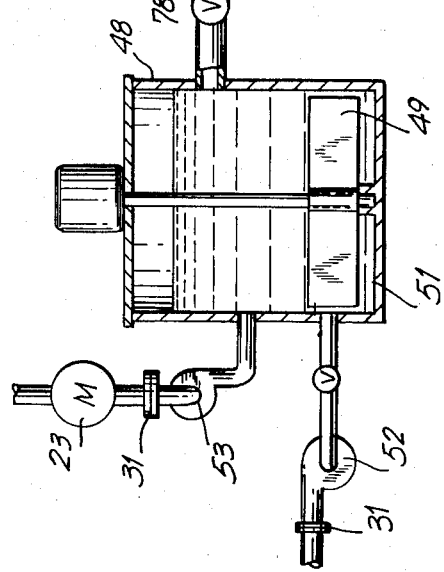

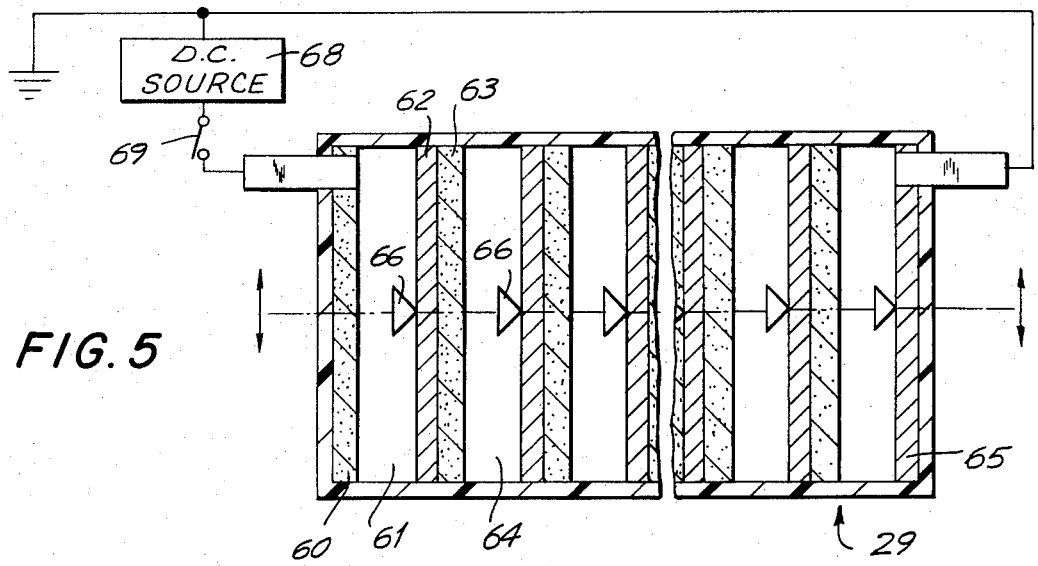
FIG. 5
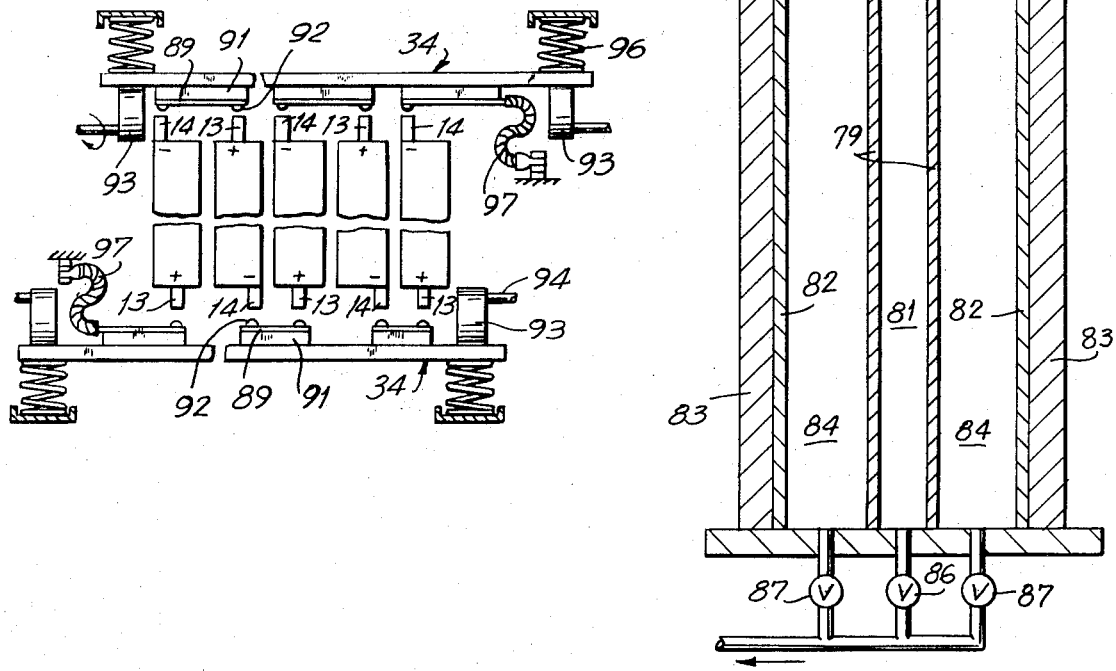
FIG. 6
FIG. 7

HYDRAULICALLY-REFUELABLE METAL-GAS DEPOLARIZED BATTERY SYSTEM

BACKGROUND OF THE INVENTION

In view of the high energy density of the zinc-air system a number of attempts have been made to devise a zinc-air battery which can be put through a large number of cycles of discharge and charge. So far as the zinc electrode is concerned, the principal difficulty arises from the fact that zinc when plated out from alkaline electrolyte is deposited in spongy, dendritic form. No separator has as yet been found which can prevent for more than a limited number of cycles the growth of dendrites from the negative grid toward the positive, in this case the air electrode, so that eventually the cell shorts out. Two very substantial efforts have been made to avoid this problem, in addition to the work which has been directed toward finding or developing a separator material which is impermeable to zinc dendrites but yet has good transfer characteristics for electrolyte and ions. In the first of these attempts, the electrolyte is moved through the cell during the charging operation, the electrolyte carrying in solution zinc oxide in unspecified form. The other method which has been studied involves drainage of the cell contents after discharge and forming charged zinc plates on a grid exteriorly of the battery and its cells. The zinc-coated plates formed in this way are then inserted into each of the cells.

It is believed that the first method failed because of the fact that circulating electric currents developed in manifolds used for removing the electrolyte from a plurality of cells and for returning the electrolyte to the cells. To keep the currents from reaching high values, it became necessary to restrict the number of cells in a battery to a comparatively low value. This made it necessary to operate the battery with a low terminal voltage, which, in turn, made it necessary to use excessively heavy and bulky wiring or, rather, bus bars for carrying the current to the device intended to be operated by the battery.

The second method, namely the plating of zinc on collectors external to the battery, generated extremely difficult handling problems. In the standard construction of zinc-air cells the zinc plate is in contact with the separator. This makes it essentially impossible to lower plates into the battery during the "charging" operation without snagging or abrading the separator and eventually ruining it. In addition, the task of placing electrodes in a battery consisting of, say, 50 cells is not only time-consuming but involves an unacceptable degree of danger due to the corrosive nature of the electrolyte if the task is to be carried out by an unskilled individual.

The principal use envisaged is for propulsion of an automobile. In view of the importance of this application for a zinc-air battery, data are presented herein which will make apparent the suitability of an indefinitely recycleable zinc-air battery for such a purpose. Similar data are available for a battery using a number of other metals and oxidizing gases other than air.

The Yardney Electric Corporation fitted a Renault Dauphine weighing 1,575 pounds with a silver-zinc battery weighing 500 pounds. The Dauphine was found to have a range of 120 miles, at a steady 40 miles per hour when running on the level. The battery which provided this energy had a nominal capacity of 230 AH, an actual capacity, when new, of 260 AH, and an operating voltage of 75 volts. It was found, therefore, that the car required about 163 WH per mile. At 25 mph the requirement was less than 67 WH/mile. These figures for the silver-zinc battery can serve as the basis for designing a zinc-air battery, since the energy/mile requirement is essentially independent of the type of battery used, except insofar as the weight of the battery affects the overall weight of the car.

If instead of a silver-zinc battery, a zinc-air battery were to be used, a battery of about the same size as their silver-zinc battery would be about 24 inches wide by 14 inches high. Assuming that each cell consists of a cathode on each of the broad faces and an anode between, then the surface area of a single cell would be 672 sq. inches. The current density at 87 A would be a modest 0.13 amps per sq. inch.

The voltage obtainable for zinc-air cells depends upon the cathode catalyst used. For a current density of 0.13 amps/sq. inch a carbon electrode of an advanced type would give an operating voltage at 72°F of 1.13. If platinum were used, the voltage would be raised by about 0.15. In view of the cost of platinum, as well as palladium, the next best catalyst, it will be apparent that the cathodes are preferably made of Teflon and carbon. Such electrodes are quite thin, and considering the high voltage obtainable with zinc, a battery resulting from a combination of an air electrode with a zinc electrode gives an unusually high energy density. For comparison, a typical lead-acid battery gives an energy density between 5 and 10 WH/pound and a silver-zinc battery of the type used for propelling an automobile gives an energy density of about 40 WH/pound. In contrast, the zinc-air battery of the present invention gives about 130 WH/pound. For a battery weighing the same as the silver-zinc battery described above, the range of the car would be increased by a factor of about 3.

Batteries for propulsion have been proposed for automobiles to be driven only a relatively short distance in each day, such as is the case where a housewife uses a car for shopping, taking her husband to and from the railroad station and transporting the children to the school and their other activities. Under such circumstances, a range of 100 miles per charge would be eminently satisfactory.

For a car with a range up to 300 or 400 miles per charge, a proportionately larger battery would be needed, and this concept can be increased for trucks.

The use of batteries for lift trucks and golf carts is already well established. For these two types of devices lead-acid batteries have been used. Recharge is carried out by plugging a line cord into a source of alternating current or direct current. Where alternating current is used, it must, of course, be rectified. Also, the voltage of the direct current must be adjusted to be appropriate to the charging voltage of the battery, Such operations can be carried out by relatively unskilled individuals. In the case of a car to be operated over relatively short distances, such as is exemplified in a car for use by a housewife, it would be desirable that the battery, in this case, a zinc-air battery, be similarly rechargeable. Unfortunately, conventional zinc-air batteries are not suitable for such use due to the fact that shorting by penetration of the separators by zinc dendrites invariably ensues after a limited number of cycles.

Now considering the case of a car which is to be driven 300 or 400 miles per day, as on a cross-country trip, for instance, the same problem arises. It would be highly desirable to be able to drive the car at the end of the discharge into a service station where the battery could be quickly recharged. Unfortunately, rapid charging is impossible because of the nature of the battery, and the penetration problem also is present. It therefore becomes apparent that zinc-air batteries at the present state of the art are not suitable for use in cars designed either to travel short distances or intermediate distances on a single charge. Nevertheless, a battery which could be quickly recharged and would be free of the danger of zinc penetration and equally free of danger arising from manipulation of components during recharge would be highly desirable.

Somewhat different considerations apply for other metals and depolarizing gases other than air. General Motors, for instance, has studied the possibility of a lithium-chlorine battery using molten electrolyte but apparently the operating problems proved insurmountable. Ford Motor Co. studied a sulphur-depolarized system with the same result. Nevertheless, energy considerations show that Li, Mg, Al, Cd and Fe in addition to Zn are desirable for use as anodes while suitable depolarizing gases are air, oxygen-enriched air, oxygen, chlorine and bromine vapor. The metals listed can all be used in aqueous systems despite the apparent incompatibility of Li with water.

SUMMARY OF THE INVENTION

A metal-gas depolarizer battery has a gas electrode, a separator engaging the gas electrode and a negative grid or collector in each cell, where the grid and the separator together with the cell walls and bottom define a compartment into which active metal powder can be poured in the form of a slurry with electrolyte. When the level of the metal powder reaches a preselected value in each of the cells comprising a battery, the transfer of metal powder and electrolyte to the cells is terminated. The cells which are separated electrically from each other during transfer of electrolyte either to or from the battery are then placed in series by a multipole switch and the battery is then ready for discharge.

At any stage up to and including complete discharge, the battery is connected by suitable tubing or piping to a holding tank, and the contents of the cells, i.e., electrolyte, with particulate discharge products and undischarged metal powder therein are transferred to the charging system. Immediately thereafter, the battery cells are filled with active metal powder and electrolyte, as aforenoted. Consequently, the battery is "recharged" in the time necessary to drain the contents of the battery and replace them with fresh electrolyte and metal powder. A preferred metal is zinc. A preferred depolarizing gas is air.

In the remainder of the specification and in the claims whenever charging or recharging of the battery or a charge of metal powder is mentioned, it is to be understood that a transfer of metal powder to the cells of the battery is being described and not electrochemical charging, i.e., reduction of oxidized metal to the metal itself. Further, the term "reactivation" will also be used to describe refilling the cells with metal powder and electrolyte.

An electrochemical charging system which may be positioned in a home garage or in a service station converts the discharge product of the battery back to metal while the automobile itself is at rest or in use. Depending on the mileage of each day's run, the charging system can be sized so that it holds from 1 to any number of batches depending on the use envisaged for the system. Where the system is to be used in a home a charging system which will accept one batch of discharge products from a battery while holding a fresh charge of active metal powder and electrolyte for reactivating the battery will be sufficient. Where the charging system is to be used in a road side service station the charging system will be sized in accordance to the number of cars expected to pull in for reactivation during a 24-hour period.

Accordingly, an object of the present invention is to provide an improved metal-gas depolarized battery which can be reactivated by filling hydraulically with a slurry of active metal powder and electrolyte.

Another object of the present invention is a metal-gas battery in which each cell has a compartment defined by a negative grid and a separator, the compartment being sized so that it will readily accept a charge of active metal powder and electrolyte.

A further object of the invention is to provide an improved metal-gas depolarized battery suitable for propulsion of an automobile wherein the battery during normal use is separated from any charging system.

An important object of the present invention is to provide an improved metal-gas depolarized battery connectable to a charging system wherein the duration of connection to the charging system need be only so long as it takes to drain the discharge contents from the battery and replace them with a fresh charge of active metal powder and electrolyte.

A particularly important object of the present invention is to provide a zinc-air battery system improved as aforenoted with respect to metal-gas depolarized batteries in general.

A significant object of the present invention is to provide an improved charging system which can accept discharge products from a metal-gas depolarized battery and convert same to metal powder suspended in electrolyte.

A further significant object of the present invention is to provide an improved charging system which can accept discharge products from a zinc-air battery and convert same to active zinc powder suspended in electrolyte.

Yet another object of the present invention is to provide an improved method of operating a metal-gas depolarized battery in which discharge products of said battery are transferred to a stationary charging system for conversion to active metal powder suspended in electrolyte which can then be used for recharging one or a number of metal-gas depolarized batteries in accordance with demand.

An additional important object of the present invention is to provide an improved method of operating a zinc-air battery in the manner described for a metal-gas depolarized battery.

Still other objects and advantages of the invention will in part be obvious and will in part be apparent from the specification.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

BRIEF DESCRIPTION OF THE DRAWING

For a fuller understanding of the invention, reference is had to the following description taken in connection with the accompanying drawing, in which:

FIG. 1 is a partially cut-away view of a metal cell in a battery in accordance with the present invention;

FIG. 2 is a partially cut-away plan view of the battery of FIG. 1;

FIG. 3 is a perspective view of a portion of a grid which both defines a compartment and functions as a negative collector;

FIG. 4 is a partially cut-away view in elevation of a charging system in accordance with the present invention;

FIG. 5 is a top view of a multicell bipolar system for reducing metal ion to active metal powder;

FIG. 6 is a top view of multipole switch for disconnecting cells electrically during drainage and replacement of the contents thereof; and FIG. 7 is a sectional view of a cell embodiment.

DESCRIPTION OF THE PREFERRED EMBODIMENTS

A battery in accordance with the present invention represented generally by the reference numeral 11 is shown (FIG. 1) with the end face removed. Battery case 12 has ports therethrough for positive pole 13 and negative pole 14. Further, it is fitted with ports 22 for filling of each cell with a slurry of electrolyte and active zinc powder. Each cell also has a port 16 for drainage of the at least partly discharged contents of each cell. For convenience, the metal will be referred to as zinc, but it is to be understood that unless otherwise stated, any of the metals Li, Mg, Al, Cd and Fe can be substituted for Zn. Similarly, any of the depolarizing gases, oxygen-enriched air, oxygen, hydrogen peroxide, chlorine and bromine, can be substituted for air. Hydrogen peroxide is regarded as a gas because, in contact with a catalyst, it decomposes, yielding oxygen.

Ports 16 and 22 are the means respectively by which discharged compounds are removed from each cell and fresh active zinc powder and electrolyte are added to each cell. Port 18 in combination with vacuum plate 19 having orifices 21 therethrough makes it possible to drain excess electrolyte from each cell while each cell is being filled with zinc powder. Ports 22 also make it possible to circulate electrolyte through the cells in order to wash them free of discharge products.

In order to avoid a multiplicity of lines and connections for draining the cells and reactivating the battery, manifolds 23, 24 and 26 are provided. Each of the manifolds 23, 24 and 26 is connected to a charging system such as is shown in FIG. 4 and indicated by the reference numeral 28 in FIG. 4 or by the reference numeral 29 in FIG. 5.

Separable hose couplers 31 are provided in each of the lines for connection from the various manifolds to one of the charging systems. Also, associated with port 16 is gate valve 32 and with port 18 is gate valve 33.

Before draining the cells of a battery, the cells are disconnected electrically from each other. In order to avoid unnecessary labor, it is preferable to use a multipole switch indicated generally by the reference numeral 34 in FIG. 6. If this were not done, circulating electric current would pass through the electrolyte in the manifolds, generating hydrogen and oxygen and wasting energy. During use, all of the manifolds are empty but there could still be short circuiting, especially between the ends of the battery by conduction through electrolyte as far as gate valves 32 and 33 and then conduction through metallic components. Consequently, it is preferable that the manifolds, and especially manifolds 23 and 24, be of insulating material such as rubber. Alternatively, sections of tubing 36 and 37 can be of insulating material and preferably of rubber hose. The rubber should be of a type that is not attacked by alkali.

A top view of a battery in accordance with the present invention is shown in FIG. 2. A representative cell indicated generally by the reference numeral 38 has an air electrode which may be of a mesh having thereon a platinum or palladium catalyst, and a separator 41. Since there is no danger of zinc penetration of the separator such as is encountered when zinc oxide is reduced in the cell itself, the separator may be of a microporous sheet where the sheet material is polypropylene or even a ceramic. The cell 38 has an air electrode and a separator at each of its exterior faces. The two separators 41 are held apart in the embodiment shown in FIG. 2 by a corrugated negative collector 42 which is preferably of copper. Another satisfactory material is silver-plated copper. A preferred form of a negative collector, also called an anode grid, is shown in FIG. 3. Tab 14 as shown in FIG. 3 is at the side of grid 42 and serves for interconnection of the plurality of cells in a battery. If desired, depending on the particular construction, tab 14 can be placed at the top of grid 42, thereby eliminating problems of sealing through the side of the cell and the battery case.

The following example which is representative of one type of construction only will indicate the type of performance which can be expected from a zinc-air battery constructed as shown herein. Taking a battery in which each cell is ¼ inch thick internally and in which the cells measure internally 24×14 inches, the volume of each cell will be 1,380cc. The packing density of zinc powder is about 1.3g/cc. The cell contains therefore 1,790g of zinc powder which at a utilization of 1.5g/AH yields 1,190AH.

A voltage of 75 is convenient for operation. Assuming that the operating temperature is 70°F the operating voltage will be about 1.13V per cell. Consequently, 66 cells will be necessary.

For a separator, as aforenoted, any microporous material is suitable. A new material which has been found excellent for the purpose is "Celgard," (a trademark of Celanese Corp.), a smooth porous polypropylene film which is commercially available. This film has a thickness of 1 mil and has pores with a diameter of approximately 0.1 micron. This separator may be placed in the cell against the air electrodes, but preferably is permanently laminated thereto. It presents but little friction as particulate materials suspended in electrolyte are taken from and returned to each cell.

Depending on the type of construction, air electrodes may weigh as little as 0.5g per sq. in. which for the cell selected as an example amounts to 336g per cell. The cell anode, cathode and electrolyte weigh 3,350g or 8.12 lb. per cell. The thickness of the electrolyte compartment is 0.25 inches. Including the zinc powder compartment, the negative grid compartment, and the air electrode with its adjacent separator and the necessary space between cells, this space being about 0.06 inches, the space needed per cell on a battery is 0.33 in. For 66 cells this amounts to 22 inches, not counting such features as end support plates, the thickness of the battery case and necessary accessories of a conventional type such as a carbon dioxide filter and a dust filter. The battery weight for the features enumerated amounts to 536 lbs. In general, another 164 lbs. must be allowed for hardware such as cell cases, anode grids, intercell connectors, tie rods, vacuum plates at the bottom of each cell, drains, hose connections and manifolds; a battery of this type then weighs about 700 lbs, depending on the particular arrangement selected.

A particularly important feature of such a battery is that circulating currents through electrolyte connections are avoided at all times. Consequently, it is possible to operate at virtually any selected voltage, taking into account the fact that excessively high voltages present possible dangers to the user. Moreover, it is possible to construct the battery so that no connections can be made to the charging system without first opening the multipole switch.

The most important feature of a battery which must store sufficient energy so that it can be used for a wide variety of purposes over a substantial period of time is that the energy density, namely the number of watt hours stored per lb. be as high as possible. In the present case, the number of watt hours available is 87A×75V×13.7 hours. Dividing this by 700 lbs, it can be seen that the energy density is 128 WH/lb. This energy density is in line with known values for zinc-air batteries of a variety of constructions. The silver-zinc battery described above gave a capacity of 260 AH at 75V, and therefore had an energy content of 19,500 WH. The weight of the battery was 500 lbs, making the energy density 39 WH/lb. The energy density of the zinc-air battery of the present invention is therefore three times as great. Taking into account the fact that the weight of the battery of the present example is greater, namely, 700 lbs. as against 500 lbs. for the silver zinc battery, the range of the Dauphine would be about 550 miles at 40 mph.

In designing a battery for a specific application, it is necessary to take into account how rapidly the battery will be discharged and the temperature of the battery. In the present example, the surface area per cell taking into account the fact that there are two electrodes per cell, is 672 sq. inches. At 87A the current density would be 0.13A/sq. inch. A gas-permeable carbon-Teflon cathode at this current density gives the following voltages as a function of temperature:

| Temp. | Voltage |
| --- | --- |
| 0°F | 1.02 |
| 32°F | 1.10 |
| 72°F | 1.13 |
| 125°F | 1.18 |

Air must, of course, be introduced into the battery case and then be transferred along the face of each air electrode. For this purpose, the space 73 between the cells and the battery case may be used as a manifold.

Assuming that the battery of the present invention is to be used in a car or even for powering a lift truck, the device using the battery is brought close to a charging system such as shown in FIG. 4 and connections are made to holding tank 43. Initially, connection must be made to manifold 24 by means of a coupler. All of the gate valves 32 are lifted simultaneously to permit the cell contents to drain into manifold 24 and then through connecting means 31 to holding tank 43. In general, the transfer will not be complete under the influence of gravity alone and consequently circulating means including a pump 44 are included. The circulating means is connected to manifold 26 through valve 77 in the usual way and then through port 22 to distributing means 74 which sprays electrolyte into each of the cells to wash out any residual particulate matter through port 16 in each cell to manifold 24 and then to holding tank 43. To prevent circulation of solid matter in the process of washing down the cells, a filter 46 surrounds intake 47 to pump 44.

To introduce a new charge of active zinc powder and electrolyte to the battery, slurry tank 48 (FIG. 4) is connected to manifold 26 through valve 75 and thence to ports 22 leading into distributing means 74 above each cell. The connection is made as usual through a hose coupler 31 or other coupling means. Slurry tank 48 (FIG. 4) contains an agitator 49 for bringing zinc powder into suspension in electrolyte as shown at 51. Transfer from slurry tank 48 to manifold 26 is effected by means of pump 52.

In general, the concentration of zinc powder suspended in the electrolyte will be such that filling each cell to the brim will not put the required quantity of zinc powder into each cell. TO bring the zinc powder level up to that desired, gate valves 33 are opened and manifold 23 is connected to vacuum pump 53. Vacuum pump 53 returns electrolyte to slurry tank 48, where it picks up additional zinc powder and is returned to the cells of the battery by means of pump 52. This process is continued until the zinc powder reaches the desired level in each cell, at which point gate valve 33 is closed, all of the manifolds are allowed to drain either into holding tank 46 or slurry tank 48, connections 31 are broken and the battery is ready for use.

Two types of chargers have been mentioned. The rotary type is shown in FIG. 4. A cathode 54 is rotated by motor 55; rotating cathode 54 has anodes 56 opposed thereto, the distance between the electrodes not being critical, but preferably kept low in order to decrease the resistance between the two electrodes insofar as is conveniently possible. Engaging the cylindrical surface of the rotating cathode is at least one wiper blade 57 which removes the spongy, active zinc deposit as it is being deposited on the rotating cathode. The removed powder, being substantially heavier than the electrolyte, generally KOH at a concentration of 35–40 percent, falls from the rotating cathode toward the bottom of tank 58. The zinc powder is kept in suspension by agitator 59 driven by a motor which is not shown. When particulate zinc oxide and zinc oxide in solution in the charge of electrolyte within tank 58 are substantially completely reduced, valve 78 is opened and the slurry is allowed to flow into tank 48. If desired, a pump can be inserted in the line connecting tanks 58 and 48 to increase the rapidity with which the transfer is made.

The voltage drop between the anode and cathode of a charging tank such as tank 58 is only about 2 volts. Consequently, in order to reduce a full batch of zinc oxide within a reasonable time, charging currents must be extremely high. To eliminate this problem, a number of tanks can be put in series. These may be rotary chargers such as indicated generally by the reference numeral 28, but a system such as is shown in FIG. 5 also may be used. The charging system 29 is a multicell unit, each one of the electrodes except for the end electrodes being bipolar. At the left-hand end of FIG. 5 is a carbon electrode 60 which is the positive electrode for cell 61. Negative electrode 62 may be of copper or silver-plated copper. Making contact with the right-hand face of electrode 62 is another carbon electrode 63. As a result of the mechanical interfacial contact between negative electrode 62 and positive electrode 63, which, again, is of carbon, no wiring for establishing contact between electrodes 62 and 63 is necessary. Electrode 63 is then the positive electrode for cell 64. The same construction is continued to the end of charging system 29, where end electrode 65 is no longer bipolar. Wipers 66 extend the height of each electrode and are wiped across the face of each negative electrode to remove the spongy zinc deposit therefrom as fast as it forms, thereby making room for more deposit without filling the cell. The dislodged powder is removed from the bottom of each cell periodically to a manifold (not shown), from which it is pumped into slurry tank 48. Prior to opening the valve to connect the bottom of each cell to the collector manifold, connection to DC source 68 is broken by means of switch 69 in order to prevent current circulation through the manifold. The electrolyte from holding tank 43 is brought either to the rotary charging system 28 or the series charging system of 29 through conduit 71 by pump 72. As aforenoted, the rotary charging tank 58 may also be placed in series, in which case a distributing manifold (not shown) is required for the rotary tanks. A similar distributing manifold (also not shown) is also required for filling the cells 61, 64, etc., of charging system 29.

To summarize, the charging system comprises a holding tank for receiving discharge product from a zinc-air battery, one or more charging tanks in which zinc oxide either in particulate form or dissolved in electrolyte is reduced to zinc, and a slurry tank in which spongy, active zinc powder can be suspended in electrolyte. In addition, pumps are provided together with suitable valves and manifolds for collecting the discharge product from the battery, distributing same to the charging system, and then carrying the formed zinc powder to a slurry tank. The capacity of the holding tank should be at least equal to the contents of a battery which it is intended to serve, while the charging capacity of the charging system should be such that the contents of a battery which it is intended to serve can be recharged in 24 hours. The same is true for the size of the slurry tank. The slurry tank is not absolutely necessary, since it is possible to store slurry in the charging tank. However, this is not the preferred mode of operation, especially where the charging tank has flat cells, as in the system shown in FIG. 5. However, where expense is a consideration, as would be the case where the system is used to service only one battery belonging to the owner of an automobile, the slurry tank may be dispensed with and the battery can be refilled directly from the charging tank.

The simplest charging system is one in which the discharge products from the battery are taken directly into a charging tank, this being the only tank. The charging system is operated until the metal ions are reduced to metal powder and the powder suspended in electrolyte, is returned to the battery. However, this mode of operation suffers from the disadvantage that the battery cannot be used while the discharge products are being reduced.

Where a charging system is to be used in a service station, it is highly preferable that a slurry tank be available, this tank serving essentially the same function as a gasoline storage tank. The charging system can run unattended nights, days and weekends, as well as holidays, and if desired, can be designed to operate at times when the demand for electricity is below peak values, thus enabling the operator to obtain a lower rate for the electricity consumed. This is particularly important for a home-owner, who can arrange to charge his zinc at off-peak times.

Alkaline electrolyte may vary in concentration from about 10 percent to about 50 percent. A concentration between 31 and 40 percent is preferable, however, in part because of its low freezing point.

With respect to operation with lithium as the reactive metal, it is well known that lithium forms a protective coating when exposed to water so that the explosive reaction encountered with sodium and potassium under such circumstances is absent. So far as aluminum is concerned, its reactivity with concentrated alkali is not so rapid but what economically useful quantities of energy can be obtained by electrochemical reactions during chemical reaction with electrolyte.

Cadmium and iron yield smaller quantities of energy per unit of weight than are obtainable with zinc, aluminum and lithium but have the advantage of inertness even during prolonged contact with electrolyte.

Operation with oxygen or oxygen-enriched air gives a substantial increase in voltage and also in energy density provided pressurized tanks of state-of-the-art materials are used as oxygen containers. Switchover to oxygen or oxygen-enriched air may be utilized as a temporary means of increasing the power output of a battery for purposes of passing another car, climbing a steep hill, etc.

Chlorine and bromine vapor may be used in combination with the metals specified, but an electrolyte which is less basic than would be used with air is preferable. Also, in the charging process, chlorine or bromine would be generated, making it desirable to recapture these materials as generated.

A cell embodiment which is particularly suited for use with holding tank 43 is shown in FIG. 7, the distinguishing feature of the cell being the use of two negative collectors 79 each of which is finely apertured. The negatives may be of expanded metal, sintered powdered metal or perforated metal. A preferred metal is copper. The apertures should be small enough to prevent the transit of visible particulate matter therethrough. A desirable range of aperture diameter is from about $10\mu$ to $300\mu$.

The two negative grids 79 define a conduit 81 therebetween. Grids 79, separators 82 and positive grids 83 define cell compartments 84 which are filled with active metal powder and electrolyte preparatory to being put into condition for discharge. To fill compartments 84, a slurry of active metal powder in electrolyte is introduced into same through valves 85. Excess electrolyte is returned through valve 86 to slurry tank 48 and the filling process is continued until compartments 84 contain the desired quantity of active metal powder.

In an embodiment (not shown) the negative grids may be apertured only in a strip near top wall 87. In this embodiment, the liquid level is automatically set at the junction between the solid portion of the negative collector and the apertured strip. Alternatively, the apertured strip can be omitted, the liquid level being established at the top of the negative grids.

Valves 87 are used for drawing discharge products from battery cells at the end of a run. The discharge products drain or are pumped to holding tank 43. The negative grids 79 can be backwashed by pumping filtered electrolyte from holding tank 43 through valve 86 into conduit 81, the electrolyte with solid matter picked up from grids 79 leaving the cells through valves 87.

The operation of multipole switch 34 is apparent from FIG. 5. Bars 88 support conductors 89 on insulators 91. Contact with cell poles 13 and 14 is made through contact buttons 92. Contact between cells is made and broken by means of eccentric cams 93 rotating on shafts 94. Springs 96 hold contact buttons 92 in firm contact with poles 13 and 14 when the multipole switch 34 is in closed position. Power from the battery is taken through flexible cables 97.

It will thus be seen that the objects set forth above, among those made apparent from the preceding description, are efficiently attained, and since certain changes may be made in carrying out the above method and in the article set forth without departing from the spirit and scope of the invention, it is intended that all matter contained in the above description and shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A hydraulically refuelable battery system, each cell in the battery of said system comprising bottom and side walls, a negative grid, a positive gas electrode opposed to said grid, a separator between said grid and said positive gas electrode, said negative grid forming with said separator and said side and bottom walls of said cell an anode compartment, first port means above each cell for introducing electrolyte and active metal powder as a slurry in electrolyte into each of said compartments, second port means proximate the bottom of each cell for removing electrolyte and solid discharge products from each cell, first manifold means, first branch tubes connecting said first manifold means with each of said first port means, second manifold means, second branch tubes connecting said second manifold means with each of said second port means, first coupling means for connecting said first manifold means to an external stationary source of electrolyte and active metal powder whereby electrolyte and electrolyte carrying suspended powder as a slurry may be transferred through said first manifold means, said first branch tubes and said first port means to each of said cells, second coupling means for connecting said second manifold means to an external receiver whereby any contents of said cells may be transferred and flushed through said second port means, said second branch tubes and said second manifold means to an external receiver, drain means in said second manifold, whereby conductive electrolyte and suspended metal powder may be drained from said second manifold for preventing undesired electric current therethrough, first valve means in each of said second branch tubes, said second branch tubes and said second manifold having therein portions of electrically insulative material between said first valve means for preventing conduction of electricity therebetween, conduit means in said battery for bringing depolarizing gas to the positive gas electrodes of all cells, switching means for electrically disconnecting all cells from each other during transfer of electrolyte and slurry to and from said battery, said cells being dimensioned to hold the entire quantity of active metal powder to be used by said cells between successive couplings to said external stationary source of active metal powder, thereby making it possible to reactivate an at least partly discharged battery by emptying same of discharge products and electrolyte and refilling the cells of said battery with a slurry of active metal powder suspended in electrolyte, which greatly reduces the time involved for reactivating a battery while avoiding the danger of shorting between opposed electrodes which arises when it is attempted to reduce metal ions to metal electrochemically in a cell used for discharge.

2. A hydraulically refuelable battery system as defined in claim 1 wherein said negative grid has essentially the form of a compartment.

3. A hydraulically refuelable battery system as defined in claim 1 wherein said negative grid has apertures which are sufficiently small to enable said grid to act as a filter for retention of solid particles in each of said cells.

4. A hydraulically refuelable battery system as defined in claim 1 wherein said separator covers the inner face of said positive gas electrode thereby preventing contact between metal powder in a cell and the corresponding positive gas electrode.

5. A hydraulically refuelable battery system as defined in claim 1 wherein said active metal is zinc and said battery includes means for introducing a depolarizing gas into said battery and means for bringing said gas into contact with the gas side of said positive gas electrodes.

6. A hydraulically refuelable battery system as defined in claim 1 wherein said active metal is selected from the group consisting of Li, Mg, Al, Zn, Cd and Fe, and said depolarizing gas is an oxygen-containing gas.

7. A hydraulically refuelable battery system as defined in claim 1 wherein said active metal is Zn and said oxidizing gas is air.

8. A hydraulically refuelable battery system as defined in claim 7 wherein said electrolyte is selected from the group consisting of aqueous NaOH and aqueous KOH.

9. A hydraulically refuelable battery system as defined in claim 8 wherein the concentration of said electrolyte lies between 10 and 50 percent.

10. A hydraulically refuelable battery system as defined in claim 8 wherein the concentration of said electrolyte lies between 31 and 40 percent.

11. A hydraulically refuelable battery system as defined in claim 1 wherein said negative grid is corrugated and apertured, each face of each cell consists essentially of a positive gas electrode having a separator engaging the interior surface thereof, and each negative grid serves to space apart the two separators in the corresponding cell and to hold a batch of said electrolyte and active metal powder in its convolutions.

12. A hydraulically refuelable battery system as defined in claim 1 wherein each cell comprises two finely apertured, vertical opposed negative grids, said grids being closely spaced apart and defining a conduit, two separators each defining a compartment with one of said grids, two gas-depolarized positive electrodes each engaging the outer surface of one of said separators, side-wall and bottom means around the peripheries of said grids, separators and positive gas electrodes, fourth port means and fourth branch tubes at the bottom of each of said conduits, said fourth branch tubes connecting each of said fourth port means with said second manifold means, third valve means in each of said fourth branch tubes, and electrically insulating sections in said fourth branch tubes and said second manifold means between said third valve means.

13. A hydraulically refuelable battery system as defined in claim 1 wherein said active metal is zinc, said electrolyte is KOH and said depolarizing gas is selected from the group consisting of air, oxygen-enriched air and oxygen.

14. A hydraulically refuelable battery system as defined in claim 1, wherein said bottom wall of each cell is finely apertured so that electrolyte free of metal powder may pass therethrough and further comprising a chamber below each apertured bottom wall, third port means proximate the bottom of each chamber, third manifold means, third branch tubes connecting each of said third port means to said third manifold means, second valve means in each of said third branch tubes, said third branch tubes and said third manifold means having therein portions of electrically insulative material between said third valve means for preventing conduction of electricity therebetween, coupling means in said third manifold means for coupling same to an external receiver for electrolyte, and drain means for emptying said third manifold of conductive electrolyte and metal powder, whereby electrolyte from said battery may be removed while supplying a slurry of electrolyte and metal powder to the cells of said battery.

15. A method of operating hydraulically refuelable metal-gas depolarized battery system, wherein the bottom of each cell is apertured and each cell has below said apertured bottom a lower chamber having third port means proximate the bottom thereof and said battery has third manifold means, third branch tubes connecting said third manifold means with each of said lower chambers for drainage of fluid therefrom, second valve means in each of said third branch tubes, second branch tubes proximate the bottom of each cell, said second branch tubes and said third manifold means having therein portions of electrically insulating materials for preventing conduction of electricity therethrough, second manifold means joined to all of said second branch tubes, coupling means for joining said third manifold means to an external receiver and means for draining said third manifold means of electrolyte, comprising the steps of disconnecting said cells electrically from each other by switch means prior to refueling, connecting said battery to a stationary charging system including an external receiver, introducing a slurry of electrolyte and active metal powder through a first manifold and first branch tubes into each cell until a desired level of metal powder is reached, preventing return of electrolyte from said cells to said external receiver, introducing electrolyte into said cells until a desired level of electrolyte is reached, disconnecting said battery from said stationary charging system, reconnecting said cells electrically, discharging said battery to a desired extent, reconnecting said battery to said stationary charging system, flushing out waste products and residual solids from said cells by passing electrolyte through said first, second and third manifolds, and producing active metal powder in said stationary charging system from said waste products.

16. A method of operating a hydraulically refuelable metal-gas depolarized battery system as defined in claim 15 wherein said active metal is a member selected from the group consisting of Li, Mg, Al, Zn, Cd and Fe.

17. A method of operating a hydraulically refuelable metal-gas depolarized battery system as defined in claim 15 wherein said battery is depolarized by a gas selected from the group consisting of air, oxygen-enriched air, $H_2O_2$, $O_2$, $Cl_2$ and $Br_2$ vapor.

18. A method of operating a hydraulically refuelable metal-gas depolarized battery system as defined in claim 15 wherein said active metal is Zn, said electrolyte is KOH and said depolarizing gas is air, oxygen-enriched air or oxygen.

19. A method of operating a hydraulically refuelable metal-gas depolarized battery system as defined in claim 15, further comprising the steps of flushing with fresh electrolyte residual solids from said cells after discharge when said battery is connected to said charging system, draining electrolyte from each of said cells during said transfer of slurry to same until the quantity of active metal in each of said cells reaches a predetermined value, terminating said drainage of electrolyte and filling each cell with electrolyte to a level at least as high as that of the active metal within said cell.

20. A method of operating a hydraulically refuelable metal-gas depolarized battery system as defined in claim 15, wherein each of said cells has two compartments, each compartment being bounded at the inner surface thereof by an apertured collector plate, said plates, cell side-walls and bottom walls forming a conduit connectable to said stationary charging system and further comprising the step of forcing electrolyte into said conduits and through said apertured plates for the purpose of removing any solid deposit in the apertures and on the surfaces of said plates facing said compartments.

* * * * *